United States Patent
Hefel

[11] 3,957,261
[45] May 18, 1976

[54] HOLDING DEVICE FOR WORKPIECES AND THE LIKE

[76] Inventor: Walter Hefel, Rosgartenstrasse 22a, Kreuzlingen, Thurgau, Switzerland

[22] Filed: Oct. 29, 1974

[21] Appl. No.: 518,869

Related U.S. Application Data

[63] Continuation of Ser. No. 366,024, June 1, 1973, abandoned.

[30] Foreign Application Priority Data

June 1, 1972   Switzerland.......................... 8159/72

[52] U.S. Cl. .............................................. 269/243
[51] Int. Cl.² ........................................... B25B 5/10
[58] Field of Search .......... 269/189, 218, 219, 228, 269/236, 243, 244, 245, 247, 249, 250, 253, 248

[56] References Cited
UNITED STATES PATENTS

| | | |
|---|---|---|
| 97,872 | 12/1869 | Burkhardt........................... 269/218 |
| 280,539 | 7/1883 | Watkins............................. 269/249 |
| 870,419 | 11/1907 | Cyr................................... 269/243 |
| 1,665,877 | 4/1928 | Fernald............................. 269/240 |
| 1,795,525 | 3/1931 | Trautner............................. 269/47 |
| 2,172,461 | 9/1939 | Whitescarver..................... 269/243 |
| 2,450,994 | 10/1948 | Schaefer........................... 269/249 |
| 2,486,683 | 11/1949 | Sass.................................. 269/243 |
| 2,639,745 | 5/1953 | Dawkins........................... 269/253 |
| 3,033,559 | 5/1962 | Lindholm........................... 269/240 |

*Primary Examiner*—Al Lawrence Smith
*Assistant Examiner*—Robert C. Watson
*Attorney, Agent, or Firm*—Michael J. Striker

[57] ABSTRACT

An elongated first member carries a pair of second members which are displaceable along the first member in direction towards one another, so as to engage and clamp a workpiece between them. An arrangement is provided for effecting such displacement of the second members in order to clamp them against a workpiece which is located between them.

8 Claims, 8 Drawing Figures

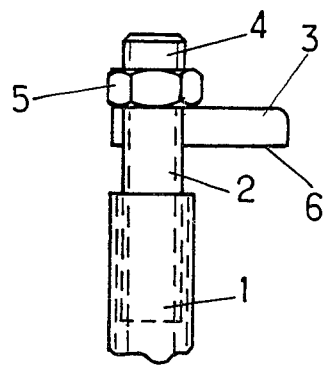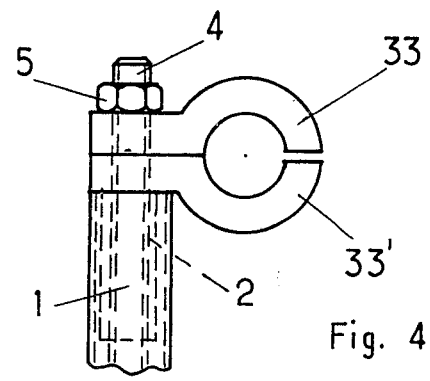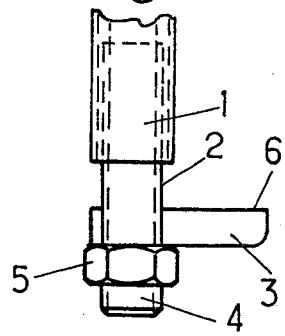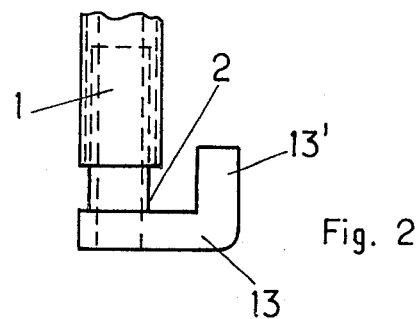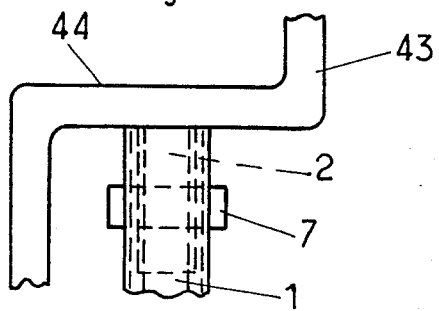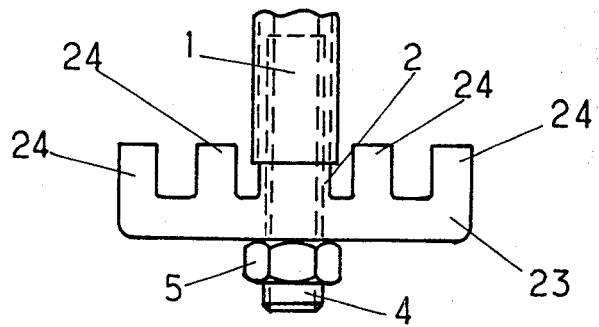

HOLDING DEVICE FOR WORKPIECES AND THE LIKE

This is a continuation of application Ser. No. 366,024, filed 6/1/73, and now abandoned.

BACKGROUND OF THE INVENTION

The present invention relates to a holding device for workpieces and the like, and in particular to a holding, distancing and fixing device for such workpieces.

There are many instances where it is desirable or necessary to clamp workpieces, which may be in form of a single article that must be subjected to such clamping action or even of two or more articles which must be pressed together. In other instances it is necessary that two or more articles be held and be firmly maintained at a fixed spacing from one another, for instance while they are being subjected to processing of some type. Such articles may be parts of machines or apparatuses, they may be cables, tubes, pipes or the like, or in fact any type of article that can require holding or clamping.

Naturally, the prior art known various types of clamping devices for this purpose. The difficulty with the prior-art arrangement is that they can be used only for one of these various functions, and can either not be adapted to all to perform any of the other functions, or can be adapted only with difficulty by using additional components or by being structurally modified. Thus, it is known to provide clamping devices which can only clamp, but cannot maintain distancing between workpieces, and conversely it is known to provide clamping devices which can provide for distancing but not for clamping therof.

This is, of course, disadvantageous for various reasons, including the fact that the modification of these devices to perform a different function, if it is at all possible, is difficult and time consuming. Moreover, the known devices are heavy and relatively expensive to produce. The reason why it is difficult if at all possible to adjust them from one function to another is because the instrumentality which causes the movement of the actual workpiece-engaging portions is mounted on these portions themselves.

The prior-art devices have additional disadvantages with which these conversant with the field are acquainted. One of these is the fact that it is either impossible to adjust them to act upon workpieces of different dimensions, or else that this can be carried out only with great difficulty. Evidently, this drastically limits the versitility of these devices.

SUMMARY OF THE INVENTION

It is, accordingly, a general object of the invention to overcome the disadvantages of the prior art.

More particularly it is an object of the invention to provide an improved holding device for workpieces and the like which overcomes the aforementioned disadvantages.

Still more specifically it is an object of the inventin to provide an improved device of the type in question which can act as a clamping device, as a distancing device and as a fixing device and avoids the prior-art disadvantages.

In keeping with these objects, and with others which will become apparent hereafter, one feature of the invention resides in a holding device for workpieces and the like which, briefly stated, comprises an elongated first member, and a pair of second members carried by the first member and being displaceable along the same in direction towards one another so as to engage and clamp a workpiece between them. Means are provided for clampingly urging the second members longitudinally of the first member towards one another and into engagement with a workpiece which is located between them.

The elongated first member may be in form of a rod or bar of substantially U-shaped cross-section, or it may be of polygonal cross-section, for instance quadratic. It may also be a tubular element in which case its cross-secton is advantageously polygonal, and again for instance quadratic. The means for clampingly urging the second members longitudinally of the first member is provided on or in the elongated first member and is advantageously located either on or closely adjacent to the longitudinal axis thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a somewhat diagrammatic side view illustrating one embodiment of the invention;

FIG. 2 is a fragmentary somewhat diagrammatic side view illustrating a further embodiment of the invention;

FIG. 3 is a view similar to FIG. 2 but illustrating an additional embodiment of the invention;

FIG. 4 is another view similar to FIG. 2, illustrating yet an additional embodiment of the invention;

FIG. 5 is a view similar to FIG. 4 illustrating still a further embodiment of the invention;

DESCRIPTION OF THE PREFERRED EMBODIMENTS

Figure 7:
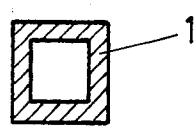
FIGS. 7 and 8 are cross-sections showing two possible cross-sectional configurations of the elongated first member of the novel device.

Discussing the drawing in detail, and firstly FIG. 1 thereof, it will be seen that reference numeral 1 identifies an elongated first member which here is a tube of quadratic cross-section, the cross-section being shown in FIG. 7. However, the tube can also be of polygonal cross-section, that is of other-than-quadratic cross-section. A pair of matingly quadratic bars or portions 2 extend into the opposite open ends of the tube 1 and are either of one part with or are rigidly connected to two transversely extending second members 3 which are in form of arms adapted to engage a workpiece placed between them (not shown) and projecting transversely beyond the elongated first member 1. A threaded rod 4 passes through the members 1 and 2, extending beyond the opposite ends of the latter; two nuts 5 are threaded onto the rod 4.

If a workpiece is to be clamped between the surfaces 6 of the arms 3, or if two or more workpieces are to be held together by such clamping action, then the arms 3 are moved axially apart to the requisite extent, by loosening the nuts 5, whereupon the workpiece or workpieces are placed between the arms 3 and the nuts are again tightened until the desired clamping action is obtained. Of course, in place of the rod 4 with the two nuts it is possible to use a threaded bolt with the nut. If the length of the portions 2 in combination with that of the first member 1 is too short in order to accommodate the workpiece or workpieces between the arms 3, then the first member 1 can be replaced with a correspondingly longer member because conventional stock material can be used for the member 1 and can, iff not already available in requisite length, easily be cut to the desired length.

The embodiment of FIG. 2 is very like the embodiment of FIG. 1, and has been illustrated only fragmentarily. All components are the same as in FIG. 1 except that the arms 3 have been replaced by the hook-shaped arms 13 having the hook portion 13'. It will be appreciated that the member 1 has two opposite ends just as in FIG. 1, and that two of the arms 13 are provided. The hook-shaped configuration permits a retaining of the particular workpiece or workpieces not only due to the clamping pressure exerted upon it, but also due to the presence of the portions 13'.

In the embodiment of FIG. 3, of which again only one end portion has been shown, it being understood that the opposite end portions with the arms are mirror symmetrically arranged, again uses like components as in FIG. 1 which are identified with the same reference numerals. In this embodiment, however, the arms 23 extend not only to one side but to both sides of the member 1 so that workpieces can be clamped or pressed together at both sides simultaneously, or selectively as desired. Because of the tooth-like portions 24 of the arms 23 the workpieces can also be mounted at a desired distance from one another or from the member 1. The arms 23 could also be configured as disks with annular concentric ribs or the like, which would be particularly advantageous if the workpieces are of tubular nature so that the ribs could either engage within or without the open ends of the workpieces.

The embodiment of FIG. 4 again is basically similar to that of FIG. 1, with like reference numerals identifying like elements. Here, however, the arms are designated with reference numerals 33 and 33' at each end (only one end with one set of arms is shown) and are each of substantially C-shaped configuration as shown. This particular configuration makes the arrangement especially suitable for retaining of bars, rods, tubes and the like, and by appropriately selecting the length of the first member 1, or changing the adjustment of the two sets of arms 33, 33' from one another in longitudinal direction of the member 1, it is possible to fix the engaged tubes or rods in a desired spacing from one another.

The embodiment in FIG. 5 again uses some of the components which have been described before and are therefore identified with the same reference numerals. Here, however, the arms 43 are S-shaped and the surfaces 44 thereof surface abutments for two objects the distance of which is to be determined by the arrangement. In other words, each of the arms (only one shown) will have one of these surfaces 44. FIG. 5 also shows that the portion 2 can be connected with the member 1 by means of a pin 7 which is extended through holes provided in the portion 2 and the member 1 and which are moved into alignment. Of course a series of axially spaced holes can be provided in one or both of the portion 2 and the member 1. The outer sections of the arms 43 can be provided with special portions or projections which permit the clamping engagement of objects having particular configurations.

It is possible to combine the various features of the embodiments thus far described, at will. Thus, a single holding device can for instance have two differently configurated arms, selected from the arms 3, 13, 23, 33 and 43 which have been disclosed herein. Again, other arm shapes cn be utilized. One of the arms could be fixedly connected with the member 1 and only the other one could be shiftable longitudinally thereof, in which case the portion 2 of this other arm advantageously would have a greater length than those which have been illustrated. It is also possible for the portions 2 to have a larger cross-section than the member 1, so that the latter is received in the portions 2, rather than vice versa as illustrated.

What is important is that the various components can be readily exchangeable so that the distance through which the arms can move relative to one another, and therefore the dimensions of the workpiece which can be accommodated between them, can be readily changed. All of the components in these various devices thus far described are standard stock components which are readily obtainable, making it possible to change the longitudinal dimension of each device, and thereby its capacity for engaging of differently configurated and dimensioned workpieces, almost at will, for instance by simply utilizing a longer or shorter first member, a longer or shorter threaded rod 4, or longer or shorter arms 3.

Figure 6:
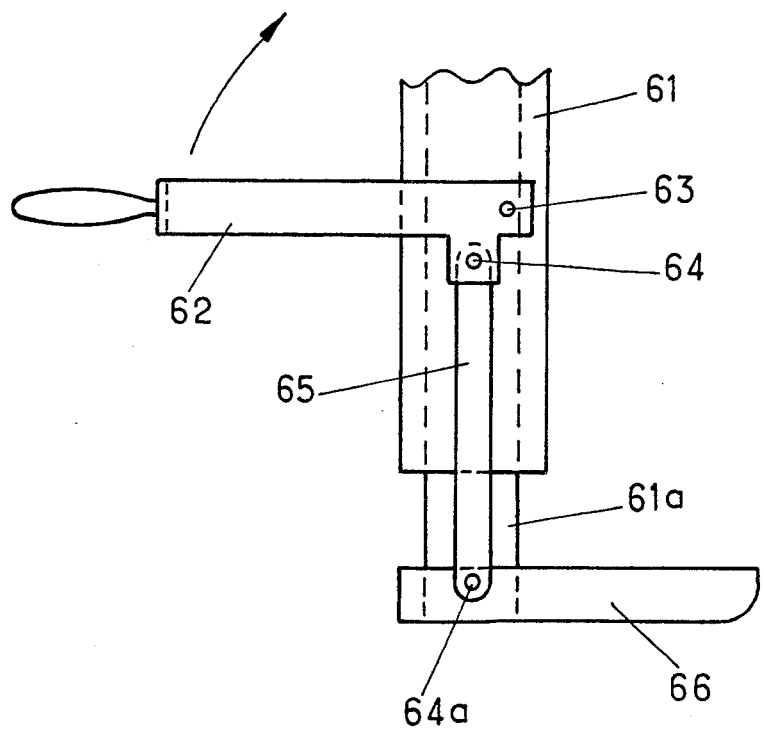
FIG. 6 is a fragmentary diagrammatic side view illustrating yet another embodiment of the invention.

Coming, finally, to the embodiment illustrated in FIG. 6 it will be seen that this also has an elongated first member 61 which again may be tubular. Only one end portion of the member 61 is shown, and the associated components are also shown only for this one end portion, but it will be understood that the other end portion will be arranged mirror-symmetrically. A lever 62 is pivoted at 63 to the member 61, and is further pivoted at 64 to a strap or bar 65 the other end of which is pivoted at 64a to a transversely extending arm 66. It should be understood that at the opposite side from the one visible in FIG. 6, that is the concealed side, a similar strap 65 will also be pivoted to the lever 62 at 64 and to the arm 66 at 64a. The lever 62 may for this purpose have a birfurcated portion which surrounds and straddles the member 61. The arm 66 has a portion 61a corresponding to the portions 2 of the proceeding embodiments and extending into the open end of the member 61.

It will be appreciated that when the lever 62 is pivoted in the direction of the arrow about the pivot 63, it will draw the portion 61a into the member 61, raising (or lowering in case of the opposite end portion) the arm 66 so that a workpiece or workpieces located between these arms will be clamped together.

Figure 8:
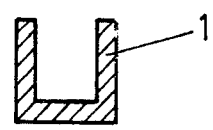

FIG. 8, finally, shows that the member 1 or 61 need not be of tubular configuration but could also be of U-shape configuration. This would not change the construction or operation of the disclosed embodiments.

It will be understood that each of the elements described above, or two or more together, may also find a useful application in other types of constructions differing from the types described above.

While the invention has been illustrated and described as embodied in holding device for workpieces and the like, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A holding device for workpieces and the like, comprising an elongated first member having longitudinally spaced end portions; a pair of second members each having a mounting portion and an engaging portion extending in a predetermined direction from and substantially normal to said mounting portion; means for mounting each of said second members on said first member for displacement longitudinally thereof, including a channel for a regular polygonal cross section provided in one of the respective end portion and mounting portion, the other of said respective mounting portion and end portion having a section of corresponding regular polygonal cirumference which is matingly receivable in said channel in as many different angular positions as there are sides of the polygon so that each respective engaging portion can extend transversely of the elongation of and beyond said first member in as many individually selected directions; and means for displacing said second members toward and away from one another longitudinally of said first member so as to engage and disengage the workpiece.

2. A device as defined in claim 1, wherein said first member is of U-shaped cross-section.

3. A device as defined in claim 1, wherein said first member is of polygonal cross-section.

4. A device as defined in claim 1, wherein said first member is of quadratic cross-section.

5. A device as defined in claim 1, further comprising holes in said first member and said mounting portion; and a pin adapted to be inserted through registering ones of said holes in said first member and said mounting portion.

6. A holding device of workpieces and the like, comprising an elongated polygonal tubular first member having longitudianlly spaced end portions; a pair of second members each having a mounting portion formed with a through hole extending centrally thereof and an engaging portion substantially normal to said mounting portion and said through hole; means for mounting said second members on said first member at said end portions for displacement longitudinally of said first member so that said engaging portions of said second members extend transvrsely of the elongation of said first member and independently in selected directions beyond said first member, said means including a channel of a regular polygonal cross section provided in one of the respective end portion and mounting portion, the other of said respective mounting portion and end portion having a corresponding regular polygonal circumference whereby the latter is receivable in said channel in as many different angular positions as there are sides of the polygon so that there is an equal number of directions in which the respective engaging portion can extend transversely of and beyond said first member; and means for displacing said second members toward and away from one another longitudinally of said first member so as to engage an disengage the workpiece, and including an elongated connecting element freely received in said first member and in said through holes and having at least one threaded end portion extending longitudinally beyond the respective second member, and at least one nut threaded on said threaded end portion of said connecting element so that said second members are urged toward one another as the nuts are tightened.

7. A device as defined in claim 6, wherein said connecting element is a threaded rod having an additional end portion extending longitudinally beyond the other of said second members; and further comprising an additional nut threaded on said additional end portion of said threaded rod.

8. A device as defined in claim 7, wherein all components of said device are of stock material.

* * * * *